Dec. 30, 1952        G. P. CASTNER        2,623,359

END PLAY TAKE-UP FOR ROTARY FLUID COUPLING

Original Filed April 12, 1947        2 SHEETS—SHEET 1

Inventor
GEORGE P. CASTNER
By Carlsen & Hoyle

Dec. 30, 1952 — G. P. CASTNER — 2,623,359
END PLAY TAKE-UP FOR ROTARY FLUID COUPLING
Original Filed April 12, 1947 — 2 SHEETS—SHEET 2
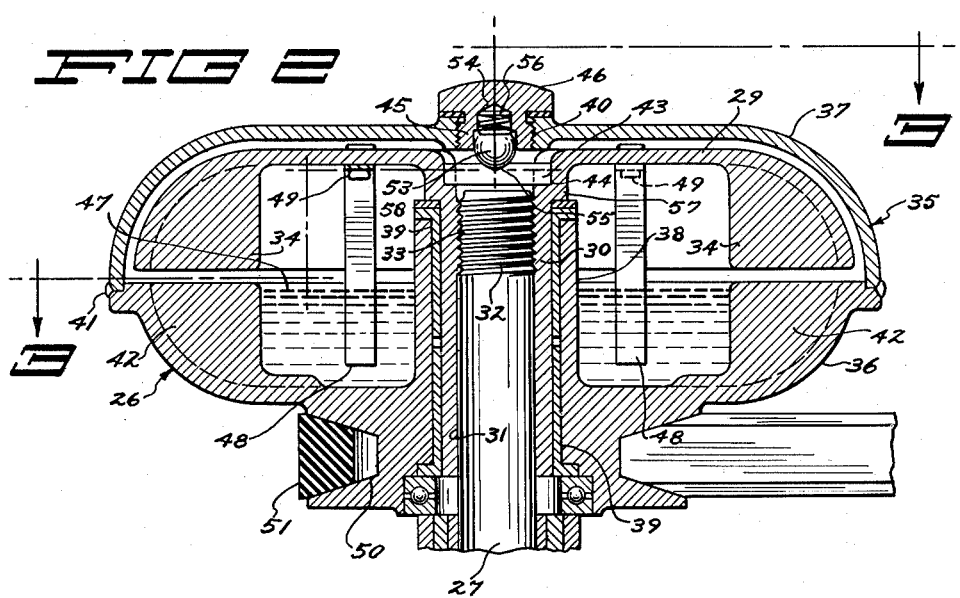
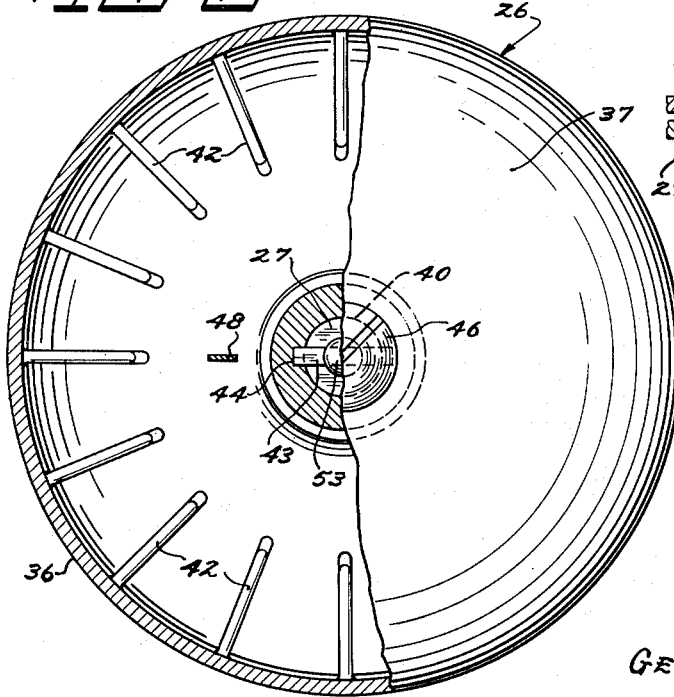
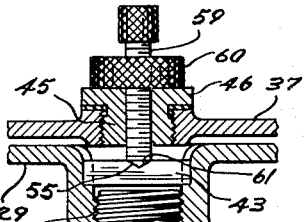
Inventor
GEORGE P. CASTNER
By Carlsen + Hayle Patented Dec. 30, 1952

2,623,359

UNITED STATES PATENT OFFICE 2,623,359

END PLAY TAKE-UP FOR ROTARY FLUID COUPLING

George P. Castner, Webster City, Iowa, assignor to Solar Corporation, Milwaukee, Wis., a corporation of Delaware Original application April 12, 1947, Serial No. 741,083. Divided and this application November 26, 1948, Serial No. 62,009

1 Claim. (Cl. 60—54)

This invention relates to improvements in fluid drive couplings for clothes washing machines and the primary object is to provide means for taking up wear and play between the relatively movable, fluid connected parts of such couplings.

This application is a division from my co-pending application Serial No. 741,083 for Fluid Drive for Clothes Washing Machines, filed April 12th, 1947. In that application there is disclosed a washing machine embodying a clothes receptacle which is rotated by a motor through a fluid drive coupling to centrifugally extract the cleansing fluid from the clothes. In accordance with my invention as set forth in more detail in this and earlier related applications, the fluid coupling is of the rotary, fluid containing, vaned type, operating on a vertical axis and is only partially filled with fluid. As a result the coupling has a high slippage factor which varies quite widely with the applied load and thus limits the speed of rotation of the loaded receptacle when the clothes therein are unevenly distributed about the spinning axis. This has the extremely advantageous features of starting up the load with a very gradual rate of acceleration to reduce the starting load on the motor, of reducing the vibration to which centrifugal extractors of this type are subjected, and finally of adjusting the spin speed according to load in such manner that a high final speed is obtainable as the load becomes better balanced without intervening periods of destructive vibrational effects. As a part further of the invention as set forth in my earlier application, and as claimed in application Serial No. 690,532, filed August 14th, 1946, now Reissue Patent No. 23,481, April 29th, 1952, in which I am a joint inventor with Arthur D. Lund, the receptacle, motor, fluid coupling and other related elements are supported for limited, snubbed and balanced vibratory movements within the outside casing of the machine, and these features all contribute to the production of a machine in which vibration is reduced to a practical minimum.

One slight difficulty has been experienced with the fluid coupling as thus arranged and used, and this results from the gradual development of slight end play between the driving and driven elements, causing an undesirable chattering effect. Since the high slippage ratio is of great importance it is necessary that the parts turn freely so that mechanical friction will not reduce the slippage nor hinder the variation thereof under changing load conditions. At the same time the fit must not be too loose and cause the chattering effect noted and the tendency to chatter is, of course, aggravated by the fact that the coupling operates on a vertical axis and is subject to limited vibration both horizontally and vertically by its mounting as described above.

It is, therefore, as stated, the primary object of the present invention to provide means for taking up play in the coupling to prevent chattering while keeping the coupling in condition for proper spin speed regulation at all times. Another object is to provide means for this purpose of an exceedingly simple nature, and capable of continuously, automatically taking up wear and play as may be required, or in another form, operative to take up play by occasional and very simple servicing.

These and other more detailed and specific objects will be disclosed in the course of the following specification reference being had to the accompanying drawings, in which—

Fig. 2 is an enlarged, vertical diametrical section through the fluid coupling alone taken along the line 2—2 in Fig. 1.

Fig. 3 is a partial plan and horizontal sectional view along the line 3—3 in Fig. 2.

Fig. 4 is a fragmentary detail sectional view showing a slight modification of the take-up means.

Figure 1:
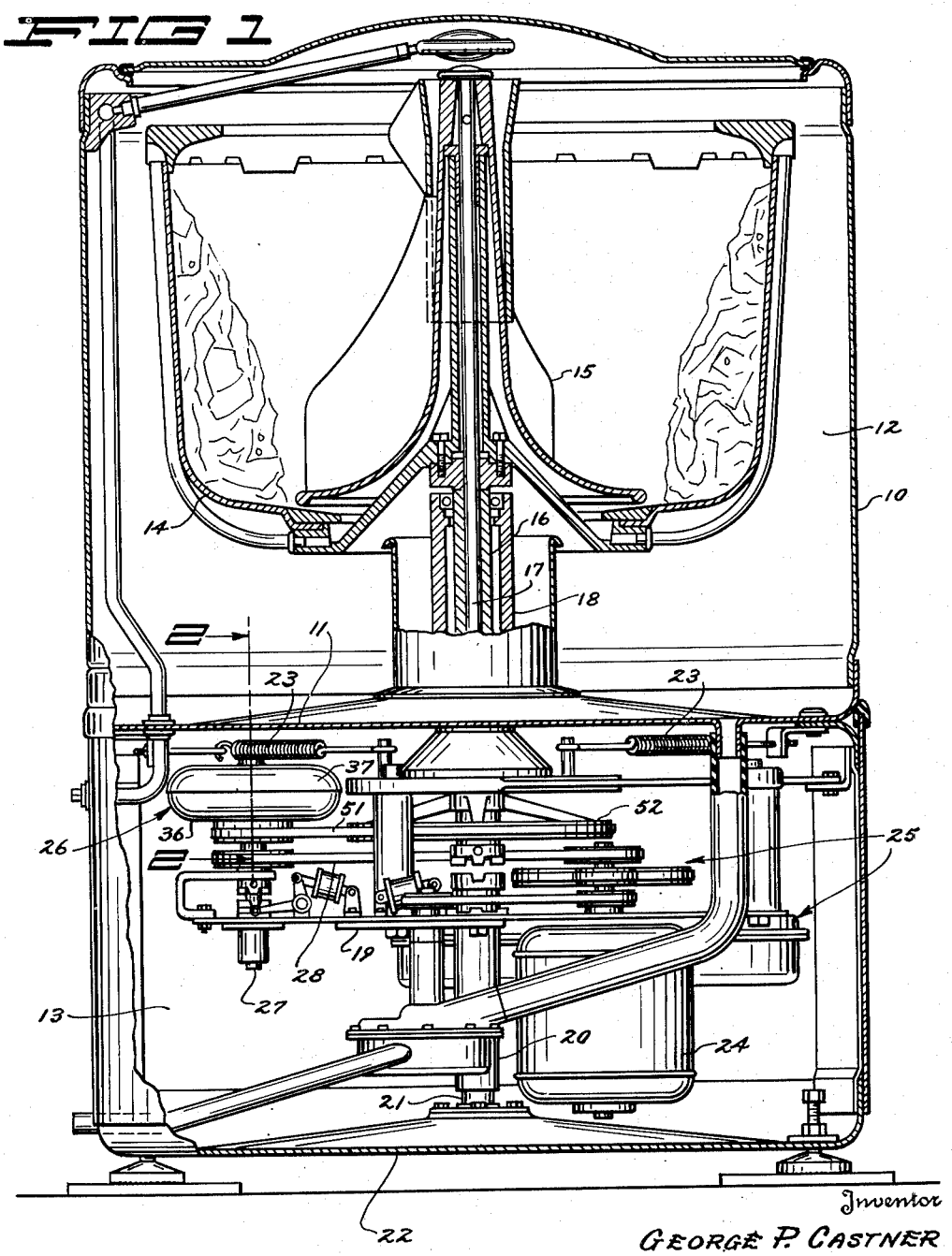
Fig. 1 is a view identical to the corresponding view in my prior application parent to this and showing in vertical section and elevation a clothes washing machine embodying my invention.

Referring now more particularly and by reference characters to the drawing, only such parts of the clothes washing machine as essential to an understanding of the present invention will be described and as seen in Fig. 1 the machine comprises an outer casing 10 divided centrally by a partition 11 into upper and lower chambers 12 and 13. Arranged in the upper chamber 12 is a rotary clothes receptacle 14 in which is an agitator 15, these elements being supported and separately operated by a tubular spin shaft 16 and a coaxial agitator shaft 17 which depend into the lower chamber 13. The shafts 16—17 are journaled in a bearing structure 18 extending loosely up through a center opening in the partition 11 and this bearing is in turn supported on a mounting plate 19 carried by a yoke 20 having a centrally located, cushioned support 21 on the center of a bottom plate 22 forming part of the casing 10. Springs 23 (and other means not shown or material to this disclosure) serve to normally and yieldably center this entire inner structure within the housing but permit limited vibrations and gyrations of the inner structure about the support 21, with respect to the housing. Carried by the mounting plate 19 is a motor 24 and a power transmission mechanism designated generally at 25 for selectively operating the agitator 15 and spinning the receptacle 14 to centrifugally discharge the cleansing fluid from the upper edge as will, it is thought, be readily understood. Included as a part of the mechanism 25 and for spinning the receptacle 14 is a fluid drive coupling or fluid drive unit 26.

This coupling 26 will be described in detail herein and as here shown it is mounted atop a countershaft 27 journaled upon the mounting plate 19 and driven through a belt 28 from the motor 24. This particular mounting is not, however, material and in fact a similar coupling mounted directly on the motor shaft is shown in application Serial No. 690,532 referred to hereinbefore.

Referring now particularly to Figs. 2 and 3 the coupling 26 comprises a circular impeller 29 having a mounting sleeve 30 provided with a bore 31 to fit the countershaft 27, or other drive shaft whatever it may be. The extremity of the shaft 27 is threaded at 32 and the sleeve 30 tapped at 33 to screw onto the shaft. The impeller 29 has a plurality of radially extending and downwardly directed vanes 34, and is enclosed within a rotary housing designated generally at 35 having two complementary dished sections 36 and 37. The lowermost housing section 37 has a tubular collar 38 surrounding the impeller sleeve 30 and interposed between the sleeve and collar are bearing bushings 39. The upper housing section 37 has a centrally located, tapped filler opening 40 axially aligned with the shaft 27. The peripheral edges of the housing sections 36 and 37 are permanently joined and sealed by a welded seam 41 and the lower section 36 has radially extending and upwardly projecting vanes 42 spaced from the impeller vanes 34 as seen in Fig. 2.

In order to screw the impeller 29 firmly on the shaft 27 to turn therewith, after the enclosing housing 35 is assembled, a diametrically extending key 43 is secured in notches 44 formed in the bore of the impeller sleeve. The key may be staked or otherwise suitably secured in place. The key is thus so located that an end slotted wrench (not shown) may be inserted through the opening 40 to engage the key and turn the impeller.

The opening 40 permits the housing to be filled with fluid after assembly and when this has been done the opening is closed by a threaded plug 45 having a head 46 overlying the margins of the opening. The housing is filled only to a level 47 about even with upper edges of the vanes 42 and thus the impeller vanes 34 stand clear of the body of fluid when the coupling is at rest. To set the fluid in motion as the impeller 29 is started in rotation I then provide two or more starting or pickup vanes 48 which are attached at 49 to the top of the impeller and depend into the fluid as seen in Fig. 2.

The lower housing section 36 has a peripheral belt groove 50 around its lower end and a belt 51 running therein is trained over a pulley 52 (Fig. 1) which is secured to and drives the tubular receptacle shaft 16.

With the coupling constructed and assembled as described it will be understood that when the shaft 27 is set in rotation by the motor 24 the resulting rotation of the impeller 29 will cause the starting vanes 48 to set the body of fluid in motion causing it to vortex and finally and gradually engage the vanes 34 and 42. The housing 35 will thus be set in motion and this rotation will be transmitted to the receptacle 14 through the belt 51. Due to the fact that the coupling operates on a vertical axis, is only partially filled with fluid, and the impeller being superimposed does not engage the fluid body when at rest except through the starting vanes, the coupling will have a high initial slippage factor and slippage will vary through a wide range under varying load conditions. As pointed out in detail in my previous applications this has the extremely desirable effect of reducing vibration in machines of this type to a practical minimum.

However, the fluid drive coupling is, due to its mounting, subject to some vibration and this, coupled with the fact that the relatively movable parts of the coupling must fit comparatively loosely in order that mechanical friction will not interfere with the slippage characteristics of the coupling, brings about some trouble due to end play and chattering developing in the course of time. To take up the end play I accordingly provide a ball 53 which fits in a recess 54 formed in the plug 45, at its inner, lower side. The ball engages a notch 55 in the center of the key 43 and is urged thereagainst by an expansion coil spring 56 braced between the ball and the upper end of the recess 54.

It will be noted that the impeller sleeve 30 has an annular shoulder 57 bearing on a bearing washer 58 on the top of the upper bushing 39 which overlies the upper end of the housing collar 38. Thus the downward pressure of the spring pressed ball 53 on the key 43 has a tendency to shift the housing axially with respect to the impeller, and so continuously takes up any wear or end play and prevents chattering from developing. The area in contact at the bearing washer 58 is so small that friction has little bearing on the operation.

In Fig. 4 I show a modification of the invention wherein the ball and spring of Fig. 2 are replaced by a thumb screw 59 which is threaded downwardly through the plug 45 and provided with a knurled lock nut 60. The lower end of the screw is pointed at 61 to engage the depression 55 in the key 43. By the periodic adjustment of the screw 59 the end play may be taken up as will be readily evident.

It is understood that suitable modifications may be made in the structure as disclosed, provided such modifications come within the spirit and scope of the appended claim. Having now therefore fully illustrated and described my invention, what I claim to be new and desire to protect by Letters Patent is:

In a fluid drive coupling for mounting on a rotating drive shaft, an impeller secured on the shaft, a fluid containing housing enclosing the impeller and rotatable on said shaft and having limited end play with respect to the shaft and impeller, said housing having an end wall spaced from the adjacent end of the shaft and impeller, a notched key on the impeller between the said end wall of the housing and the end of the shaft, the improvement which comprises a plug in the end wall and having a recess facing the notch in the key, a ball in the recess engaging said notch, and a spring in the recess engaging the ball and urging it against the key to take up end play between the housing and the impeller.

GEORGE P. CASTNER.

(References on following page)

REFERENCES CITED

The following references are of record in the file of this patent:

UNITED STATES PATENTS

| Number | Name | Date |
|---|---|---|
| 1,572,972 | Tabb | Feb. 16, 1926 |
| 1,859,607 | Sinclair | May 24, 1932 |
| 1,932,246 | Kirby | Oct. 24, 1933 |
| 1,963,720 | Sinclair | June 19, 1934 |
| 2,129,366 | Swennes | Sept. 6, 1938 |
| 2,380,596 | Hertrich | July 31, 1945 |
| 2,404,900 | Carlson | July 30, 1946 |
| 2,455,249 | Haller | Nov. 30, 1948 |
| 2,513,845 | Castner | July 4, 1950 |
| 2,526,082 | Mertz | Oct. 17, 1950 |
| 2,533,544 | Zavarella | Dec. 12, 1950 |